United States Patent [19]

Oshima et al.

[11] Patent Number: 5,005,027

[45] Date of Patent: Apr. 2, 1991

[54] THERMAL RECORDER

[75] Inventors: Hisaichi Oshima, Minoo; Masami Yamashita, Takarazuka, both of Japan

[73] Assignee: Furuno Electric Co., Ltd., Hyogo, Japan

[21] Appl. No.: 503,096

[22] Filed: Mar. 30, 1990

Related U.S. Application Data

[63] Continuation of Ser. No. 128,888, Dec. 4, 1987, abandoned.

[30] Foreign Application Priority Data

Dec. 5, 1986 [JP] Japan ................... 62-291316

[51] Int. Cl.$^5$ ......................................... G01D 15/10
[52] U.S. Cl. ........................ 346/76 PH; 346/33 EC; 346/62
[58] Field of Search ............... 346/76 PH, 33, 62

[56] References Cited

U.S. PATENT DOCUMENTS

| | | | |
|---|---|---|---|
| 4,096,484 | 6/1978 | Ferre et al. | 346/33 EC |
| 4,249,186 | 2/1981 | Edwards | 346/35 |
| 4,331,963 | 5/1982 | Dahlström et al. | 346/62 |

Primary Examiner—Bruce A. Reynolds
Assistant Examiner—Gerald E. Preston

[57] ABSTRACT

The present invention relates to a thermal recorder employing a linear array of heat-producing elements which moves in a direction on heat-sensitive recording paper advanced in a direction perpendicular to the array scan direction. The recorder can be used for recording groups of facsimile picture signals successively received at a time interval with different degrees of darkness in direct proportion to the amplitude of the facsimile signal.

9 Claims, 6 Drawing Sheets

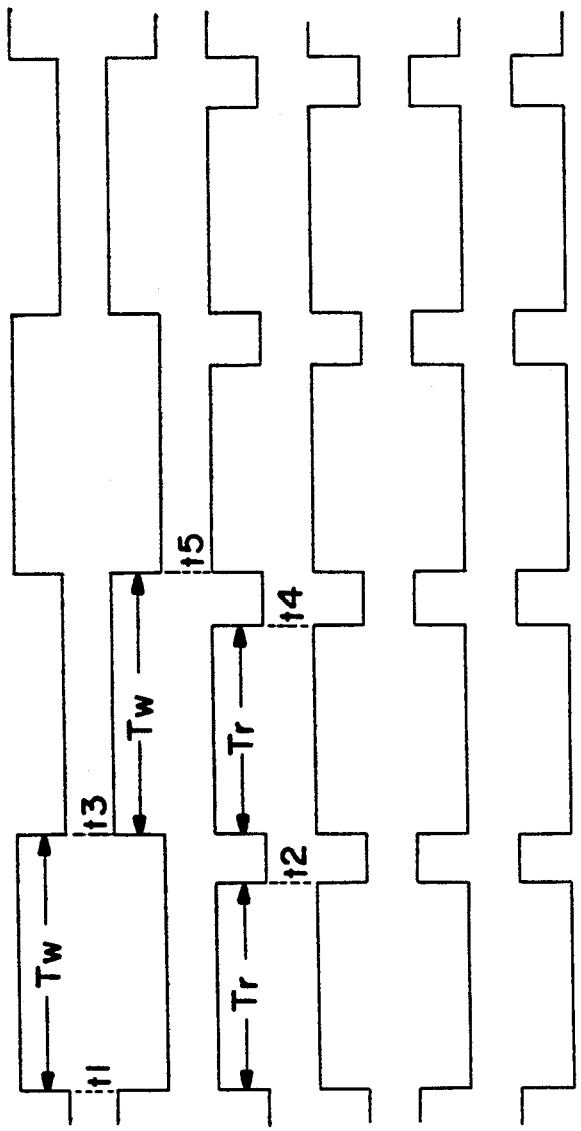
FIG. 2a
FIG. 2b
FIG. 2c
FIG. 2d
FIG. 2e
FIG. 2f
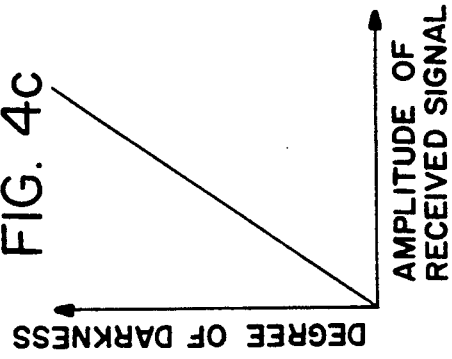
FIG. 4c
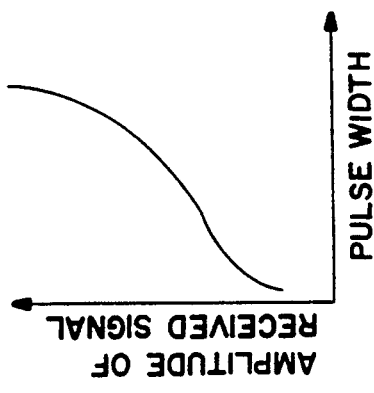
FIG. 4b
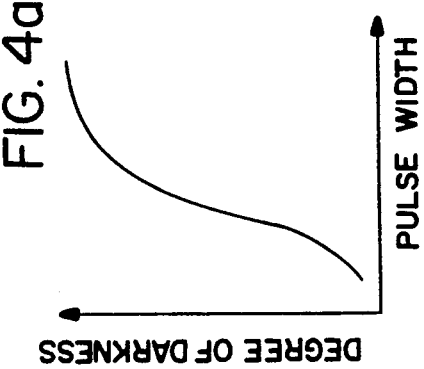
FIG. 4a

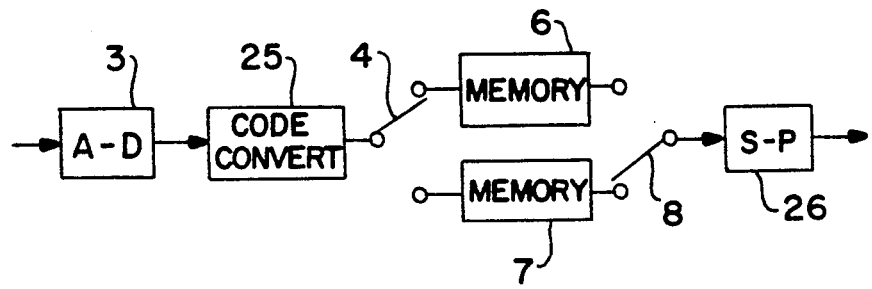
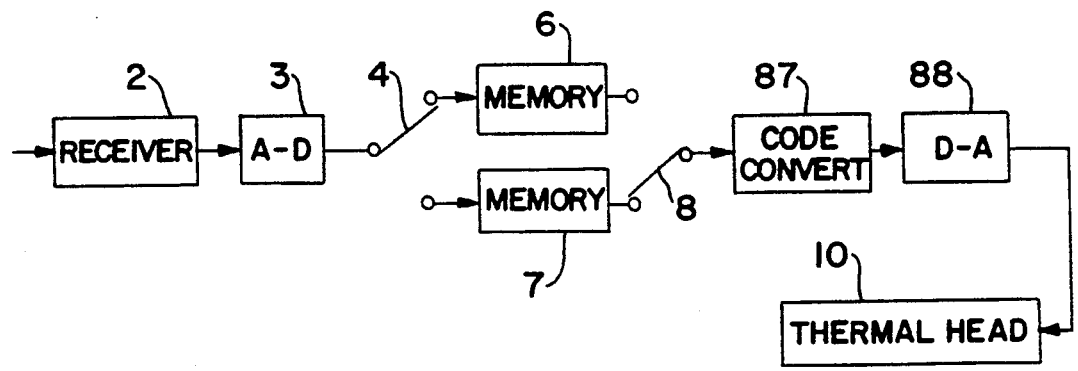
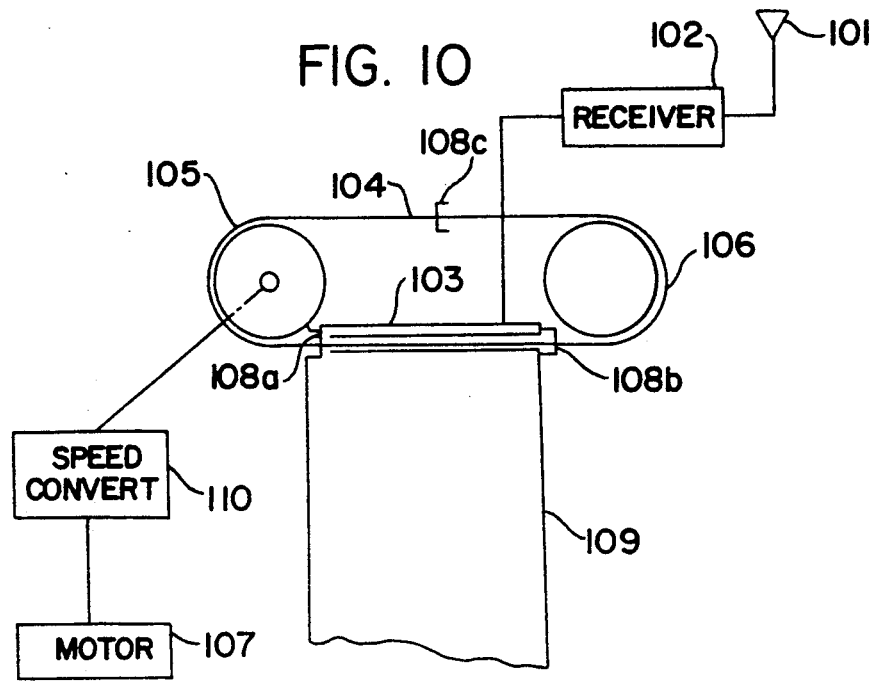

5,005,027

THERMAL RECORDER

This application is a continuation of application U.S. Ser. No. 07/128,888 filed on Dec. 4, 1987, now abandoned.

BACKGROUND OF THE INVENTION

The present invention relates to a thermal recorder employing a linear array of heat producing elements which moves in a direction on heat-sensitive paper advanced in a direction perpendicular to the array moving direction. Particularly, it relates to a thermal recorder for recording groups of information signals successively received at a time interval with different degrees of darkness, by giving to heat-sensitive paper heat energy depending on the amplitude of a received information signal.

The invention can be embodied in a facsimile recorder or in the recorder of an ultrasonic underwater detection system.

Hereinafter, the invention will be explained as embodied in a facsimile recorder for receiving and recording groups of facsimile signals transmitted successively at a time interval from a remote transmitting station, with a group of the facsimile signals recorded on an imaginary scan line on heat-sensitive recording paper.

A prior art facsimile recorder will be explained, with reference to FIGS. 10 and 11. An antenna 101 receives groups of facsimile signals, with a group of the signals including a synchronous signal "S" and signals representing pictures successively received at a time period "Ts" of, for example 1 second, as shown in FIG. 11a. A receiver 102 amplifies and demodulates the received facsimile signals which are coupled to a contact rail 103. An endless belt 104 is extended about a driving pulley 105 and a driven pulley 106, and is driven at uniform speed by a motor 107 through a speed converter 110. Three recording styli 108a, 108b and 108c are fixed on the endless belt at uniform space intervals. Electrically sensitive recording paper 109 moves progressively lengthwise in a direction perpendicular to the direction of stylus scan. The contact rail 103, endless belt 104 and electrically sensitive recording paper 109 are disposed in such a way that both ends of the recording styli slide on the contact rail 103 and the recording paper respectively.

With the prior art facsimile recorder, three styli must be fixed on the endless belt at precisely uniform space intervals, which is very hard to be adjusted, and further, transmitted pictures are not faithfully reproduced, since the degrees of darkness marked on the paper are not in direct proportion to the amplitude of the received facsimile picture signals.

SUMMARY OF THE INVENTION

Accordingly, an object of the present invention is to provide a thermal recorder employing a linear array of heat-producing elements which moves in a direction on heat-sensitive recording paper which is advanced in a direction perpendicular to the array moving direction.

Another object of the invention is to provide a thermal recorder for recording, on heat sensitive recording paper, groups of information signals successively received at a time interval with different degrees of darkness, by giving energy to heat sensitive paper heat dependent upon the amplitude of a received information signal.

Another object of the invention is to provide thermal facsimile recorder for recording facsimile signals on heat-sensitive recording paper advanced in a direction such that an array of heat producing elements moves in a direction perpendicular to the paper progressing direction.

Another object of the invention is to provide a thermal facsimile recorder for recording facsimile signals on heat-sensitive paper with different degrees of darkness by providing heat producing elements of a thermal head with heat energy depending on the amplitude of the received facsimile signals.

Another object of the invention is to provide a thermal facsimile recorder to provide the heat producing elements of the thermal head with pulse signals having their widths dependant upon the amplitude of received signals.

A further object of the invention is to provide a thermal facsimile recorder for recording, simultaneously and in parallel, facsimile signals received during a plurality of transmission time intervals, by means of a thermal head comprising a linear array of heat-producing elements.

A still further object of the invention is to provide a recorder for an underwater detection system employing a linear array of heat-producing elements moved on heat-sensitive paper, for recording received signals representing underwater conditions.

According to one aspect of the invention, a thermal recorder comprises (i) heat-sensitive paper which is advanced lengthwise, (ii) a linear array of heat-producing elements which move across paper in a direction perpendicular to the paper advancing direction, (iii) reception means for receiving information signals generated at a time interval, (iv) at east two storing means, each for storing first signals resulting from the information signals received during a plurality of the time intervals (v) conversion means for converting the first signals supplied from one of the storing means, into second signals in accordance with a predetermined relationship between the received information signals and the second signals, (vi) coupling means for coupling the resultant second signals to the heat-producing elements, thereby recording the information signals with different degrees of darkness substantially in direct proportion to the amplitude of the signals, (vii) drive means for alternately moving the array of heat-producing elements and the heat-sensitive paper.

BRIEF DESCRIPTION OF THE DRAWINGS

In the drawings:

FIG. 2 shows waveforms for explaining the operation of the thermal facsimile recorder shown in FIG. 1, FIG. 8 shows a schematic block diagram of a portion of another embodiment according to the present invention, FIG. 9 shows a schematic block diagram of a portion of another embodiment of the present invention, FIG. 10 shows a bock diagram of a prior art facsimile recorder.

Throughout the drawings, the same reference numerals are given to like components.

DETAILED DESCRIPTION OF THE PREFERRED EMBODIMENTS

Figure 1:
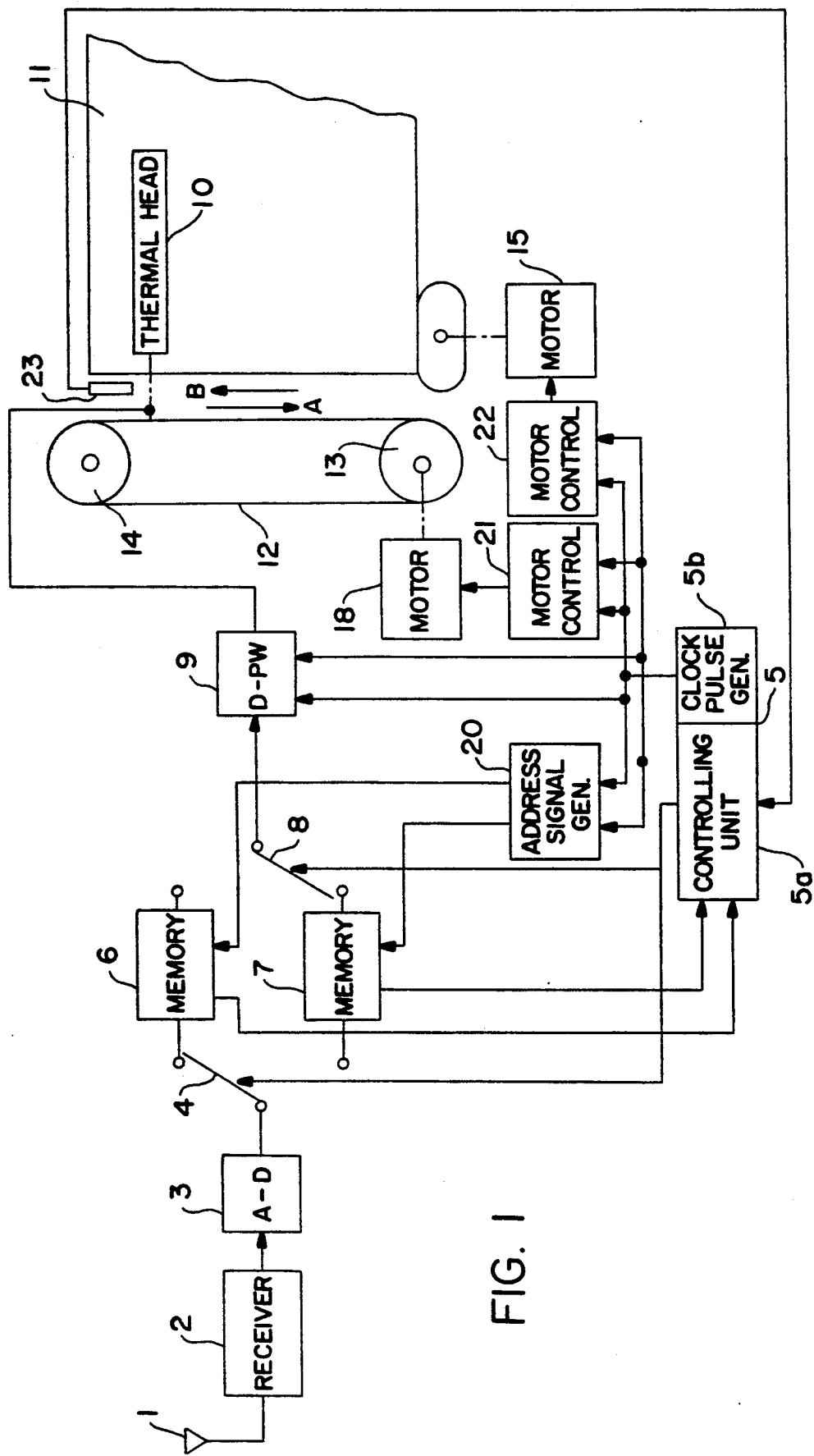
FIG. 1 shows a schematic block diagram of an embodiment of a thermal facsimile recorder according to the present invention.
Figure 11A:
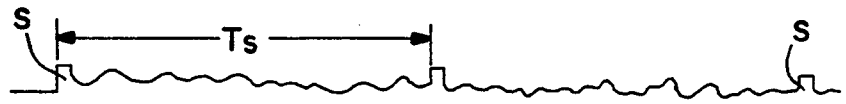
FIG. 11 shows waveforms representing facsimile picture signals transmitted by a facsimile transmitting station.
Figure 11B:

Referring to FIG. 1, an antenna 1 receives groups of facsimile signals including, for example, synchronous signals and signals representing a weather picture used for weather forecast, successively transmitted from a transmitting station, as shown in FIG. 11a. A scan line drawn by a heat-producing element on heat-sensitive recording paper comprises signals including a synchronous signal "S" and picture signals during a time period "Ts" of, for example 1 second, as shown in FIG. 11. Another synchronous signal and other picture signals, which form another scan line, are radiated by the transmitting station in the following time interval "Ts". In the same way, synchronous signals and picture signals are successively transmitted by the transmitting station. A receiver 2 amplifies and demodulates the received signals. An analog-to-digital converter(hereinafter referred to as A-D converter) 3 samples the demodulated signals "n" times during the time interval "Ts" and converts the resultant signals into digital signals of, for example, three bits. A connector 4 is controlled by a controller 5 to couple the digital signals forming eight scan lines to a memory unit 6 and another memory unit 7 alternately. The memory unit 6 is comprised of, for example, 8×"n"×3 RAM(ramdom access memory) memory elements, and thus stores facsimile signals corresponding to eight scan lines. The memory unit 7 is constructed in the same way as the memory unit 6, and stores facsimile signals of eight scan lines. A connector 8 is controlled by the controller 5 to couple the stored signals in the memory units 6 and 7 alternately to a digital-to-pulsewidth converter(hereinafter referred to as D-PW converter) 9. The connectors 4 and 8 may comprise electronic switches, and are operated in such a way that when the connector 4 is connected to the input terminal of the memory unit 6, the connector 8 is connected to the output of the memory unit 7, and vice versa. The D-PW converter 9 converts the digital signals from the memory units 6 and 7 into pulse signals having their pulse widths determined in accordance with a predetermined relationship between the digital value from the memory units and a corresponding pulse width. The D-PW converter 9 has, for example, eight output terminals which are connected to a thermal head 10. The construction and operation of the D-PW converter 9 will be explained in detail hereinafter. The thermal head 10 comprises a linear array of eight heat-producing elements which are disposed on an imaginary straight line at uniform space intervals, and are moved in two forward and backward directions on heat-sensitive recording paper 11. The pulse signals, having various pulse widths depending on the amplitude of received facsimile signals, are respectively supplied from the eight output terminals of D-PW converter 9 to the corresponding heat-producing elements of the thermal head 10. The thermal head 10 is mechanically coupled and fixed to an endless belt 12 which is extended about a driving pulley 13 and a driven pulley 14. The driving pulley 13 is driven by a pulse-driven motor 18 in a clockwise direction and in an anti-clockwise direction. The heat-sensitive recording paper 11 is intermittently advanced by a pulse-driven motor 15 lengthwise.

The controller 5 comprises a controlling unit 5a and a clock pulse generator 5b. The controlling unit 5a controls the connector 4 in such a way that when the writing operation or one of the memory units 6 and 7 is completed, the connector 4 is connected to the input terminal of the other memory unit. The controlling unit 5a controls the connector 8 in such a way that during the period the connector 4 is connected to the input terminal of one memory unit, the connector 8 is connected to the output terminal of the other memory unit. The controlling unit 5a also provides an address signal generator 20, the D-PW converter 9, a motor controller 21 and another motor controller 22 with control signals. The controlling unit 5b supplies the address signal generator 20, the D-PW converter 9, the motor controller 21 and the motor controller 22 with clock pulse signals. The address signal generator 20 comprises address counters, and produces write address signals and read address signals which are alternately supplied to the address input terminals of the memory units 6 and 7, based on the controll signals and the clock pulse signals received from the controlling units 5a and 5b. The address signal generator 20 supplies the write address signals to the memory unit 6 during a time period "Tw" as shown in FIG. 2a, and hence, digital output signals from the A-D converter 3 are written into the memory unit 6. The address signal generator 20 supplies the read address signals to the memory unit 7 during a time period "Tr" as shown in FIG. 2c, and hence, the signals stored in the memory unit 7 are transferred to the D-PW converter 9. In the following time period, after the connector 4 is connected to the input terminal of memory unit 7 and the connector 8 is connected to the output of memory unit 6, the address signal generator 20 furnishes the memory unit 7 with write address signals during the time period "Tw" and the memory unit 6 with read address signals during the time period "Tr". The memory unit 6 transmits an end signal to one input terminal of the controlling unit 5a, when its write operation or read out operation is competed. In the same way, the memory unit 7 provides the controlling unit 5a with an end signal, when digital signals corresponding to the eight scan lines are all written thereinto, or when the signals stored therein are fuy read out therefrom.

A start point detector 23 produces a start point signal, when the thermal head returns to the start point, and transmits the signal to another input terminal of the controlling unit 5a. The motor controller 21 comprises two groups of pulse generators, each for producing four pluses having the same pulse width and which are phase-shifted with each other, and generates and supplies to the pulse driven motor 14 two kinds of driving signals, i.e., driving signals for rotating the shaft of the motor 14 in a clockwise direction and driving signals of the other kind for rotating the motor in a counter-clockwise direction. The motor controller 21, controlled by the controlling unit 5a, supplies the pulse motor 14 with the driving signals to rotate the shaft thereof in a clockwise direction, thereby moving the thermal head 10 in a "down" direction as shown with an arrow "A". The motor controller 21 supplies the pulse motor with the other driving signals for rotating the motor 14 in a counter-clockwise direction, when the thermal head reaches a predetermined end point on the recording paper, thereby moving the thermal head in an "up" direction as shown with an arrow "B" and returning it to the original point. The motor controller 22 comprises pulse generators for generating four pulses having the same pulse width and which are phase-shifted with each other. It further starts to generate and supplies to the pulse motor 15 driving signals for rotating the shaft thereof in a clockwise direction for a predetermined time interval, when the thermal head reaches the end point on the paper 11, thereby moving the recording paper 11 by a length necessary for recoding received signals corresponding to the eight scan lines.

Referring to FIGS. 1 and 2, the operation of the embodiment of the invention will be explained. It is first assumed that the connector 4 is connected to the input terminal of the memory unit 6 and the connector 8 is connected to the output terminal of the memory unit 7. Facsimile signals are caught by the antenna 1, and amplified and demodulated by the receiver 2, and converted to digital signals by the A-D converter 3. The digital signals corresponding to eight scan lies are successively written into the memory unit 6 during the time period "Tw". This occurs while the signals stored previously in the memory unit 7 are successively transferred to the D-PW converter 9 during the time period "Tr", converted into pulse signals having their widths depending on the digital values thereof, and then supplied respectively to the corresponding heat-producing elements of the thermal head 10 which starts to move downward, when the connector 4 is connected to the memory unit 6 at a time instant "t1". Thus, eight scan lines are drawn during the time period "Tr". When the thermal head reaches the end point on the recording paper 11 at the time instant "t2", the pulse motor 18 is controlled so that the shaft thereof is rotated in the reverse direction, thereby returning the thermal head 10 to the original point, as shown in FIG. 2e. At the same time, the pulse motor 15 is also controlled to advance the recording paper by a length corresponding to the eight scan lines, as shown in FIG. 2f. The memory unit 6 transmits an end signal to the controlling unit 5a at a time instant "t3" when it completes writing the digital signals from the converter 3 thereinto. The start point detector 23 produces a start point signal when the thermal head 10 returns to the original point, and supplies it to the controlling unit 5a. At the time instant "t3", the connectors 4 and 8 are turned to the input terminal of the memory unit 7 and the output terminal of the memory unit 6 respectively. This time, the digital signals are successively written into the memory unit 7 during the time period "Tw" up to the time instant "t5" as shown in FIG. 2b, while the digital signals stored in the memory unit 6 are successively transferred to the D-PW converter 9, and then supplied to the heat-producing elements of the thermal head 10 which is moving, during the time period "Tr" up to the time instant "t4". At the same instant "t4", the motor 14 is controlled to move the thermal head 10 in the "up" direction, and the motor 15 starts to advance the paper 11 in a rightward direction. In the same way, there will be continued operations for receiving facsimile signals and storing the converted signals and recording the resultant pulse signals on the heat-sensitive paper 11.

Figure 3:
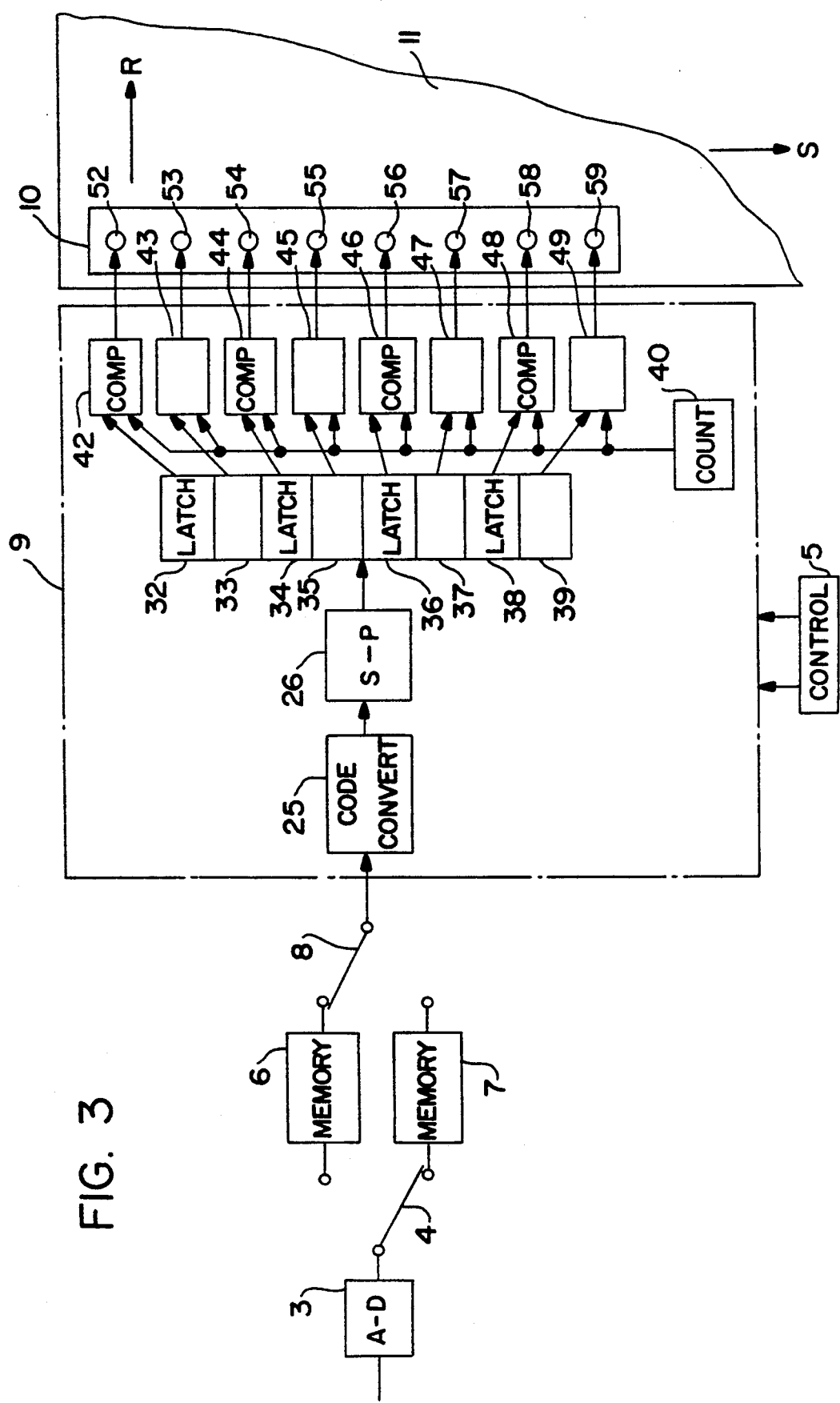
FIG. 3 shows a schematic bock diagram of a portion of the embodiment shown in FIG. 1, FIGS. 4a, 4b, 4c show curves for explaining the relationship between the amplitude of a received facsimile signal and the degrees of darkness appearing on heat-sensitive recording paper.

Referring to FIG. 3, the construction and operation of a D-PW converter 9 will be explained. The D-PW converter 9 is supplied with control signals and clock pulse signals by the controller 5. The digital signals stored in the memory unit 6 or 7 are supplied to a code converter 25 through the connector 8. The code converter 25 comprises ROM(read only memory) elements in which a table representing the relationship between digital input values and digital output values is incorporated. The table has been determined in such a way that the degree of darkness appearing on the heat-sensitive paper 11 is in direct proportion to the amplitude of a facsimile signal.

FIG. 4a shows the relationship between the pulse width of the pulse signals applied to the heat-producing elements of the thermal head 10 and the degree of the darkness appearing on the paper in response to the heat energy given by the heat producing elements. FIG. 4b shows the relationship between the pulse width of the pulse signals applied to the heat-producing elements of the thermal head 10 and the amplitude of the facsimile signals received. FIG. 4c represents the relationship between the amplitude of the facsimile signals received by the facsimile receiver and the degree of the darkness appearing on the paper 11. FIG. 4c shows that the degree of the darkness on the paper 11 is in direct proportion to the amplitude of the facsimile signals received. In order to obtain the relationship between the degree of the darkness on the paper and the amplitude of the facsimile signals as shown in FIG. 4c, the curve representing the relationship between the pulse width of the pulse signals applied to the heat-producing elements and the degree of the darkness on the paper 11 as shown in FIG. 4a has to be compensated. This is done by the curve representing the relationship between the pulse with of the pulse signals applied to the thermal head 10 and the amplitude of the received signals as shown in FIG. 4b. The table is made in accordance with the curve shown in FIG. 4b. When a digital signal is supplied to the input terminal of the code converter 25 from the memory unit 6 or 7 a corresponding digital signal is produced at the output terminal of the converter 25 and supplied to a series-to-parallel converter 26. The series-to-parallel converter 26 has eight output terminals which are connected to the input terminals of latch circuits 32 through 39 disposed in parallel with each other. The series-to parallel converter 26 places successively received eight digital signals at the eight output terminals thereof respectively. Each of the latch circuits 32 through 39 comprises three flip-flop circuits, and is controlled by the controller 5 to store a corresponding digital signal of three digits. The latch circuit 32 stores digital picture signals forming the first scan line, and supplies the digital signals once stored therein to one input of a digital comparator 42. The latch circuit 33 stores digital picture signals forming the second scan line drawn by the thermal head 10, and transmits the signals to one input terminal of a digital comparator 43. In the same manner, the latch circuits 34 through 39 store the digital signals forming the third through ninth scan lines for a predetermined time period, and feed the signals to corresponding digital comparators 44 through 49. A counter 40, controlled by the controller 5, is reset to zero at a time instant when the digital signals are stored in the latch circuits respectively, and then performs an addition counting operation to produce successively increasing counts to be applied to the other input terminals of the digital comparators 42 through 49. Here, the digital output signal of each of the latch circuits 32 through 39 is represented as "E", and the digital output signal from the counter 40 is represented as "F" The digital comparator 42 compares the output signal "E" from the latch circuit 32 with the count value "F" from the counter 40 to produce a high-level signal during a time a relationship "E">"F" is maintained, to a heat-producing element 52 of the thermal head 10. The digital comparator 42 produces a low-level output signal to the element 52 while "E" is smaller than "F". As a result, received facsimile signals are recorded with the degree of darkness in direct proportion to the amplitude thereof on the heat-sensitive paper 11. In the same manner, the digital comparators 43 through 49 produce and supply pulse signals having their widths dependent upon the amplitude of the received facsimile signals to the corresponding heat-producing elements 53 through 59. The thermal head 10 is moved in a rightward direction represented with an arrow "R", when a group of the pulse signals is transformed into heat energy given to the recording paper 11 to record the facsimile signals, by a length corresponding to a picture element. In the same way, the recording operation will be repeatedly continued until the thermal head 10 reaches the end point, in synchronism with the read out operation in the memory units 6 or 7. As a result, eight scan lines are drawn on the recording paper 11. The recording paper 11 is then moved in a downward direction represented with an arrow "S", by a length corresponding to eight scan lines.

Figure 5:
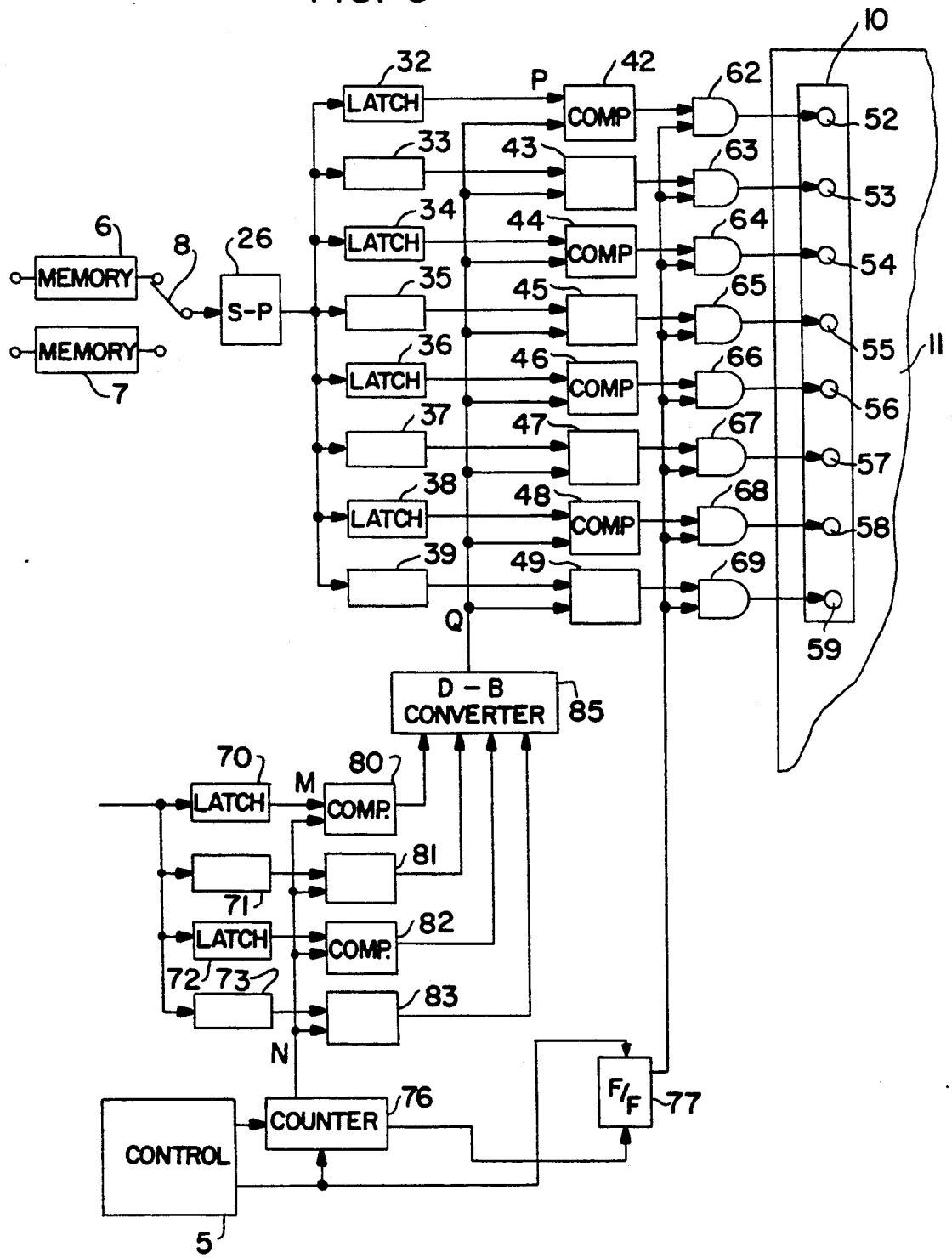
FIG. 5 shows a schematic block diagram of another configuration of the portion of the embodiment shown in FIG. 1.

Referring to FIG. 5, the construction and operation of another D-PW converter will be explained Hereinafter, there will be explained a case or recording facsimile signals with four different shade of darkness by means of a thermal recorder. The D-PW converter is supplied with control signals and cock pulse signals by the controller 5. The digital signals stored in the memory unit 6 or 7 are supplied to the series to parallel converter 26 through the connector 8. The series-to-parallel converter 26 having eight output terminals supplies digital signals successively received from the memory unit, to the latch circuits from 32 through 39 which store digital picture signals forming eight scan lines respectively and supply them to one input terminals of the digital comparators 42 through 49.

Figure 6:
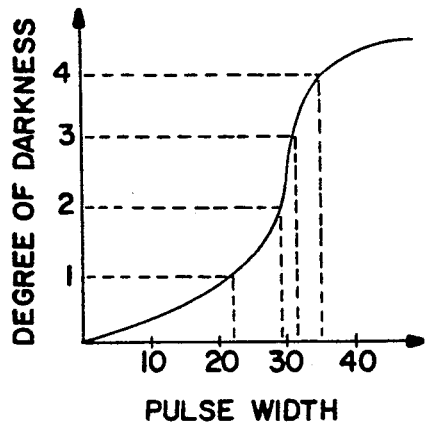
FIG. 6 shows a curve representing the relationship between the width of the pulse signals supplied to the thermal head and the degrees of darkness appearing in response to the pulse signals on the heat-sensitive recording paper.
Figure 7A:
FIG. 7 shows waveforms for explaining the operation of the embodiment shown in FIG. 5.
Figure 7B:
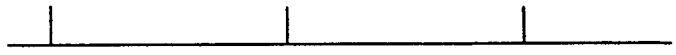
Figure 7C:
Figure 7D:
Figure 7E:
Figure 7F:
Figure 7G:

Each of latch circuits from 70 through 73 comprises six flip-flop circuits. The latch circuit 70 stores in advance, for example, a digital signal representing a numerical value "22" determined in accordance with the compensation curve representing a relationship between the pulse width and the degree of the darkness appearing on the recording paper 11, as shown in FIG. 6. Similarly, the latch circuits 71, 72 and 73, in advance and through recording a whole picture, store digital signals representing numerical values "29", "32" and "35" respectively determined in accordance with the curve shown in FIG. 6. The digital signals stored in the latch circuits 70 through 73 are supplied to one of the input terminals of corresponding digital comparators 80 through 83. The controller 5 supplies a pulse signal as shown in FIG. 7b to the reset input terminal of a counter 76 to set its count zero, and also to the set input terminal of a flip-fop circuit 77. The counter 76 is supplied with clock pulse signals at its one input terminal from the controller 5. The counter 76 is reset to zero count with the pulse signal from the controller 5, and then performs an addition counting operation in response to each clock pulse supplied thereto, and supplies the resultant successively increasing count values to the other input terminals of the digital comparators 80 through 83. It then transmits a pulse signal to the reset input terminal of the flip-flop circuit 77 when the count value in the counter 76 reaches, for example, "50", thereby resetting the circuit 77. The digital comparators 80 through 83 are identical ones. The digital comparator 80 compares the output signal represented as "M" from the latch circuit 70 with the count value represented as "N" from the counter 76, and produces a high-level output signal while a relationship "M">"N" is established and maintained, and continues to produce a low-level signal while "M" is smaller than "N". The comparator 80 continues to output a high-level signal until the count value in the counter 76 reaches "22", since it has received the value "22" from the latch circuit 70. Similarly, the comparators 81 through 83 continue to produce high-level signals until the counts obtained by the counter 76 reach decimal numerical values "29", "32" and "35" respectively. A decimal-to-binary converter(hereinafter referred to as D-B converter) 85 has four input terminals represented as decimal values "1", "2", "3" and "4" respectively. The output signals from the comparators 80, 81, 82 and 83 are coupled to the "1", "2", "3" and "4" input terminals of the D-B converter 85 respectively. The D-B converter 85 produces a binary value "001" while the low level signal is applied only at the input terminal "1", and supplies the digital signal to the other inputs of the comparators 42 through 49. The converter 85 produces and supplies a binary value "010" to the other inputs of the comparators 42 through 49 during a time period the low level signals are applied to the input terminals "1" and "2" of the converter 85. In the same way, the D-B converter 85 produces a digital value "011" while the low-level signals are applied at all the input terminals "1", "2" and "3" of the converter 85. The converter 85 produces a binary value "100" while the low-level signals are applied at all the input terminals. The digital comparator 42 compares the output signal represented as "P" from the latch circuit 32 with the digital signal represented as "Q" from the D-B converter 85, and produces a high level signal to one input of an AND gate 62 while a relationship "P">"Q" is established and maintained. The comparator 42 produces a low-level signal to the AND gate 62 when "P" is smaller than "Q". In the same way, the digital comparators 43 through 49 produce high-level signals to the one inputs of AND gates 63 through 69 while the digital signals "P" from the latch circuits 33 through 39 are arger than the binary signals supplied to the other inputs of the corresponding AND gates from the D-B converter 85 respectively. If a binary value "001" representing the amplitude of a facsimile signal is stored in the latch circuit 32, the comparator 42 produces a pulse signal having its width as shown in FIG. 7d to the AND gate 62. If a digital value "011" is stored in the latch circuit 33, the digital comparator 43 produces a pulse signal having its width as shown in FIG. 7f to the AND gate 63. If a digital value "100" is stored in the latch circuit 34, the comparator 44 produces a pulse signal as shown in FIG. 7g to the AND gate 64. If a digital value "010" is stored in the latch circuit 35, the comparator 45 supplies the pulse signal as shown in FIG. 7e to the AND gate 65. Similarly, each of the comparators 46, 47, 48 and 49 supplies one of the signals shown in FIGS. 7d, 7e, 7f and 7g depending on the numerical value stored in the corresponding one of latch circuits 36, 37, 38 and 39 to the corresponding one of the AND gates 66, 67, 68 and 69. The flip-fop circuit 77 applies the signal shown in FIG. 7c to the other input terminals of the AND gates 62 through 69. As a result, the AND gate 62 supplies the signal shown in FIG. 7d to a heat-producing element 52 of the thermal head 10. In the same way, the AND gates 63 through 69 supply their resultant output signals to the heat-producing elements 53 through 59 respectively. The output signals from the series-to-parallel converter 26 are stored in the latch circuits 32 through 39 at a time instant when a pulse signal shown in FIG. 7a is produced. After the heat energy is given to the paper 11 by the heat-producing elements 52 through 59 in response to the pulse signals applied thereto, the terminal head is moved in a rightward direction by the width of a picture element, and then the next recording is performed. The recording and moving operations will be performed alternately until the thermal head reaches the end point on the paper 11, thereby drawing eight scan lines. Then, the thermal head 10 returns to the original point, and the recording paper 11 is advanced.

Referring to FIG. 8, another embodiment according to the present invention is obtained by modifying the embodiment shown in FIG. 3. The code converter 25 is placed between the A-D converter 3 and the connector 4, and the connector 8 selectively connects the input terminal of the series-to parallel converter 26 to the output terminal of one of the memory units 6 and 7. The other arrangement is the same as the one in FIG. 3.

Referring to FIG. 9, a code converter 87 and a digital-to-analog converter(hereinafter referred to as D-A converter) 88 are incorporated between the connector 8 and the thermal head 10. The memory unit 6 or 7 stores the digital signals corresponding to a plurality of scan lines. The code converter 87 comprises ROM elements, in which a table representing the relationship between digital input values and digital output values is incorporated. The table is made to compensate the relationship between the degree of the darkness on the paper 11 and the amplitude of the received facsimile signal so that the degree of the darkness is in direct proportion to the amplitude of the received facsimile signals.

While the invention has been described in detail and with reference to specific embodiments thereof, it will be apparant to one skilled in the art that various changes and modifications can be made therein without departing from the spirit and scope of invention.

What is claimed is:

1. A thermal recorder for recording information on heat-sensitive paper comprising:
    means for advancing heat-sensitive paper lengthwise through said recorder;
    a linear array of heat-producing elements advanced across the paper in a direction perpendicular to the paper advancing direction;
    reception means for receiving information signals, each of an amplitude value, generated for a plurality of sets of time intervals, each set being a predetermined number of time intervals and each time interval being of a predetermined length;
    a plurality of storing means, each for storing first signals corresponding to the amplitude values of the information signals received during said plurality of sets of time intervals;
    first switching means, alternately connecting each of said plurality of storing means with said reception means, for switching said connection of said reception means to a different one of said plurality of storing means after each said set of a predetermined number of time intervals;
    digital to pulse-width conversion means for converting said first signals supplied from one of said plurality of storing means, into second signals of a predetermined pulse width in accordance with a predetermined relationship between the amplitude values of the received information signals and the pulse width of the record signals;
    second switching means, alternately connecting each of said plurality of storing means with said digital to pulse-width conversion means, for switching said connection of said digital to pulse-width conversion means to a different one of said plurality of storing means after each said set of a predetermined number of time intervals, such that said reception means and said digital to pulse-width conversion means are continuously connected to a different of said plurality of storing means;
    coupling means, connected to said digital to pulse-width conversion means, for coupling the resultant second signals of a predetermined pulse width to heat-producing elements of a terminal recording means;
    said thermal recording means recording the received information signals, each of an amplitude value, with different degrees of darkness substantially in direct proportion to the amplitude values of the received information signals in response to said pulse-widths of said second signals; and
    drive means for alternately moving the array of heat-producing elements during said recording by said thermal recording means and for then moving said heat sensitive paper upon completion of said recording by said recording means.

2. A thermal recorder as defined in claim 1, wherein:
    the heat-sensitive paper has characteristics reflecting the degree of darkness appearing on the paper in accordance with heat-energy given thereto in proportion to said second signals pulse-widths;
    the conversion means converts the first signals into the second signals in accordance with a relationship between the amplitude of the received information signal and the degree of the darkness, obtained based on the characteristics so that the information signals received are recorded on the paper with degrees of darkness substantially in direct proportion to the amplitudes of the received information signals.

3. A thermal recorder as defined in claim 1 wherein the conversion means converts the first signals into pulse signals having widths dependent upon the amplitude of the received information signals.

4. A thermal recorder for recording information on heat-sensitive paper comprising:
    means for advancing heat-sensitive paper lengthwise through said recorder;
    a linear array of heat-producing elements advanced across the paper in a direction perpendicular to the paper advancing direction;
    reception means for receiving information signals, each of an amplitude value, generated for a plurality of sets of time intervals, each set being a predetermined number of time intervals and each time interval being of a predetermined length;

analog-to-digital conversion means for converting the received information signals of amplitude values into first digital signals, such that said digital signals correspond to said amplitude values of said received information signals;

code converting means for converting said first digital signals into second digital signals of a predetermined pulse width such that the amplitude values of said received information signals are in direct proportion to said predetermined pulse width;

a plurality of storing means, each for storing digital signals resulting from the signals received during one of said plurality of sets of time intervals;

first switching means for alternately connecting each of said plurality of storing means to said code converting means after each said set of a predetermined number of time intervals;

digital to pulse-width conversion means for converting said second digital signals into heat-energy-producing signals of a predetermined pulse width in a proportional relationship between the second digital signals and the pulse-width of the at-energy producing signals;

second switching means for alternately connecting each of said plurality of storing means to said digital to pulse-width conversion means after each said set of a predetermined number of time intervals, such that said code converting means and said digital to pulse-width conversion means are continuously connected to a different one of said plurality of storing means;

coupling means, connected to said digital to pulse-width conversion means, for coupling the resultant heat-energy-producing signals of a predetermined pulse-width to the heat-producing elements of a thermal recording means;

said thermal recording means recording the information signals, each of an amplitude value, with different degrees of darkness substantially in direct proportion to the amplitude values of the received information signals in response to the pulse widths of the heat-energy-producing signals; and drive means for alternately moving the array of heat-producing elements during said recording by said thermal recording means and further moving the heat sensitive paper upon completion of said recording by said recording means.

5. A thermal recorder as defined in claim 4 wherein the code converter is incorporated between said second coupling means and said conversion means.

6. A thermal recorder as defined in claim 4 wherein the code converter is incorporated between the analog-to-digital conversion means and the first coupling means.

7. At thermal facsimile recorder for recording information on heat-sensitive paper comprising:

means for advancing heat-sensitive paper lengthwise through said recorder;

a linear array of heat-producing elements advanced across the paper in a direction perpendicular to the paper advancing direction;

reception means for receiving facsimile picture signals, each of an amplitude value, generated for a plurality of sets of time intervals, each set being of a predetermined number of time intervals and each time interval being of a predetermined length;

a plurality of storing means, each for storing first signals corresponding to the amplitude values of the facsimile signals received during said plurality of sets of time intervals;

first switching means for alternately connecting each of said plurality of storing means to said reception means after each said set of a predetermined number of time intervals;

digital to pulse width conversion means for converting said first signals supplied from one of said plurality of storing means, into second signals of a predetermined pulse width in accordance with a predetermined relationship between the amplitudes of the received facsimile signals and the pulse width of the second signals;

second switching means for alternatively connecting each of said plurality of storing means to said digital to pulse-width conversion means after each said step of a predetermined number of time intervals, such that said reception means and said digital to pulse-width conversion means are continuously connected to a different of said plurality of storage means;

coupling means, connected to said digital to pulse width conversion means, for coupling the resultant second signals of a predetermined pulse width to the heat-producing elements of a thermal recording means;

said thermal recording means recording the facsimile signals, each of an amplitude value, with different degrees of darkness substantially in direct proportion to the amplitude values of the received facsimile picture signals in response to the pulse widths of the second signals; and drive means for alternately moving the array of heat producing elements during said recording by said thermal recording means and for then moving the heat sensitive paper upon completion of said recording by said recording means.

8. A thermal facsimile recorder for recording information on heat-sensitive paper comprising:

means for advancing heat-sensitive paper lengthwise through said recorder;

a linear array of heat-producing elements advanced across the paper in a direction perpendicular to the paper advancing direction;

reception means for receiving facsimile picture signals, each of an amplitude value, generated for a plurality of sets of time intervals, each set being of a predetermined number of time intervals and each time interval being of a predetermined length;

analog-to-digital conversion means, connected to said reception means, for converting the received facsimile signals of amplitude values into first digital signals;

code converter means, connected to said analog-to-digital conversion means, for converting the first digital signals into second digital signals;

a plurality of storing means, each for storing said second digital signals corresponding to the amplitudes of the facsimile signals received during said plurality of sets of time intervals;

digital to pulse-width conversion means for converting said second digital signals into heat-energy-producing signals of a predetermined pulse-width in accordance with a predetermined relationship between the second digital signals and the pulse width of the heat-energy-producing signals;

first coupling means for alternatively coupling said code converter means to each of said plurality of storing means after each said set of a predetermined number of time intervals;

second coupling means for alternately coupling said digital to pulse-width conversion means to each of said plurality of storing means after each said set of a predetermined number of time intervals, such that said code converter means and said digital-to-pulse-width conversion means are continuously connected to a different of said plurality of storage means;

supplying means, connected to said digital to pulse-width conversion means, for supplying the resultant heat-energy-producing signals of a predetermined pulse width to the heat-producing elements of a thermal recording means;

said thermal recording means recording the facsimile signals, each of an amplitude value, with different degrees of darkness substantially in direct proportion to the amplitude values of the received facsimile signals in response to the pulse widths of the heat-energy-producing signals; and drive means for alternately moving the array of heat-producing elements during said recording by said thermal recording means for then moving the heat-sensitive paper upon completion of said recording by said recording means.

9. A thermal recorder for recording information on heat-sensitive paper in an underwater detection system comprising:

means for advancing heat-sensitive paper lengthwise through said recorder;

a linear array of heat-producing elements advanced across the paper in a direction perpendicular to the paper advancing direction;

reception means for receiving echo signals, each of an amplitude value, representing underwater conditions for a plurality of sets of time intervals, each set being of a predetermined number of time intervals and each time interval being of a predetermined length;

a plurality of storing means, each for storing first signals corresponding to the amplitude values of the echo signals received during said plurality of sets of time intervals;

first switching means for alternately connecting each of said plurality of storing means to said reception means after each set of a predetermined number of time intervals;

digital-to-pulse-width conversion means for converting said first signals supplied from one of said plurality of storing means, into second signals of a predetermined pulse width in accordance with a predetermined relationship between the amplitudes of the received echo signals and the pulse-width of the second signals;

second switching means for alternately connecting each of said plurality of storing means to said digital-to-pulse-width conversion means after each said set of a predetermined number of time intervals, such that said reception means and said digital to pulse-width conversion means are continuously connected to a different of said plurality of storage means;

coupling means, connected to said digital-to-pulse-width conversion means, for coupling the resultant second signals of a predetermined pulse width to the heat-producing elements of a thermal recording means;

said thermal recording means recording the echo signals, each of an amplitude value, with different degrees of darkness received substantially in direction proportion to the amplitude values of the echo signals in response to pulse widths of the second signals;

drive means for alternately moving the array of heat-producing elements during said recording by said thermal recording means and for then moving the heat-sensitive paper upon completion of said recording by said recording means.

* * * * *